(12) United States Patent
Kennedy (10) Patent No.: US 8,627,555 B2
(45) Date of Patent: Jan. 14, 2014

(54) MEMORIAL PRODUCT INCLUDING CREMATION REMAINS

(71) Applicant: Crystal Remembrance LLC, Dublin, OH (US)

(72) Inventor: James Kennedy, Columbus, OH (US)

(73) Assignee: Next Future LLC, Dublin, OH (US)

( * ) Notice: Subject to any disclaimer, the term of this patent is extended or adjusted under 35 U.S.C. 154(b) by 0 days.

(21) Appl. No.: 13/677,933

(22) Filed: Nov. 15, 2012

(65) Prior Publication Data

US 2013/0117977 A1    May 16, 2013

Related U.S. Application Data

(60) Provisional application No. 61/559,852, filed on Nov. 15, 2011.

(51) Int. Cl.
*A61G 17/00* (2006.01)

(52) U.S. Cl.
USPC .......... 27/1; 428/542.4; 65/60.2; 65/66

(58) Field of Classification Search
USPC .......... 27/1; D99/5; 428/542.4; 211/85.27; 65/60.2, 66
See application file for complete search history.

(56) References Cited

U.S. PATENT DOCUMENTS

| | | | |
|---|---|---|---|
| 2,549,658 A | 4/1951 | Blythe | |
| 5,987,720 A * | 11/1999 | Yamamoto | 27/35 |
| 6,382,111 B1 * | 5/2002 | Hojaji | 110/341 |
| 6,510,596 B1 * | 1/2003 | McCarthy | 27/1 |
| 6,550,114 B1 | 4/2003 | Reece | |
| 6,615,463 B1 | 9/2003 | Hojaji | |
| 7,117,570 B1 | 10/2006 | Borgerding | |
| 7,228,602 B2 * | 6/2007 | Weisbrot et al. | 27/1 |
| 7,266,866 B2 | 9/2007 | Vogel et al. | |
| 2002/0025392 A1 * | 2/2002 | Yardley et al. | 428/3 |
| 2003/0154581 A1 * | 8/2003 | Jain et al. | 27/1 |
| 2004/0154528 A1 * | 8/2004 | Page, Jr. | 117/84 |
| 2008/0209945 A1 | 9/2008 | Blevins | |
| 2008/0264882 A1 * | 10/2008 | Sviberg-Krahner | 211/85.27 |
| 2009/0077779 A1 | 3/2009 | Zimmerman et al. | |

(Continued)

FOREIGN PATENT DOCUMENTS

| DE | 202010008253 U1 * | 11/2010 |
|---|---|---|
| EP | 0452275 | 4/1991 |

(Continued)

*Primary Examiner* — William Miller
(74) *Attorney, Agent, or Firm* — Hahn, Loeser & Parks LLP; Rex W. Miller, II (57) ABSTRACT

A memorial product is presently disclosed that includes a glass structure having a first helix of cremation remains and a second helix of a second material, wherein the helix of the cremation remains and the helix of the second material are intertwined to form a double helix in the glass structure. In some embodiments, the second material is additional cremation remains or a colored material selected to correspond to the deceased represented by the cremation remains. Also disclosed is a method of manufacturing a memorial product including forming a first portion of molten glass into a substantially cylindrical shape having an exterior surface, applying cremation remains on a first portion of the exterior surface, applying a second material on a second portion of the exterior surface, and gathering a second portion of molten glass over the first portion of molten glass to encase the cremation remains and the second material.

20 Claims, 9 Drawing Sheets

(56) References Cited

U.S. PATENT DOCUMENTS

| | | |
|---|---|---|
| 2009/0089988 A1 | 4/2009 | Johnson, Sr. |
| 2009/0185454 A1 | 7/2009 | Allen et al. |
| 2009/0266108 A1 | 10/2009 | Balme et al. |
| 2010/0005835 A1 | 1/2010 | Johnson, Sr. et al. |
| 2010/0199476 A1 | 8/2010 | Cummings et al. |
| 2011/0204135 A1 | 8/2011 | Hershenhorn et al. |
| 2012/0266424 A1 * | 10/2012 | Martino .................... 27/1 |

FOREIGN PATENT DOCUMENTS

| | | | |
|---|---|---|---|
| GB | 2431390 A | * | 4/2007 |
| GB | 2468709 A | * | 9/2010 |
| WO | WO 2006103347 A1 | * | 10/2006 |
| WO | 2007098570 | | 9/2007 |

* cited by examiner

MEMORIAL PRODUCT INCLUDING CREMATION REMAINS

CROSS-REFERENCE TO RELATED APPLICATION

This application claims priority to U.S. Provisional Patent Application No. 61/559,852, filed Nov. 15, 2011, which is incorporated herein by reference.

BACKGROUND AND SUMMARY

The present disclosure relates to a memorial product, and more particularly to a memorial product with cremation remains encased in glass. A method of manufacturing a memorial product is also disclosed.

In recent years, cremation has become an increasingly common option for many people. Cremation is often less expensive than traditional burial and may be considered more environmentally friendly as resources are not expended on caskets and vaults, and land is not consumed for use as a cemetery. When the body of the deceased person or animal is cremated, there remains a portion of ash commonly known as cremation remains or cremains. The cremation remains often include inorganic matter that was not consumed during the cremation process. Additionally fragments of bones may remain after the cremation, and those fragments may be crushed or ground and mixed with the ash and other materials that survive the cremation process.

In the past, it has been customary for cremation remains to be provided to the family of the deceased in an urn. As an average human may produce several pounds of cremation remains, typical urns have consisted of a large container with a lid in which the cremation remains are stored. In some urns, the cremation remains are enclosed in a plastic bag. Most urns are readily identifiable as an urn and may be associated with death and morbidity. As such, after an initial grieving period, urns tend not to be displayed prominently. In addition, although an urn may have a lid, if the urn is upset the cremation remains may be spilled. As the cremation remains include many fine particles and ash, it may not be possible to return the cremation remains to the urn once spilled. It is also common for cremation remains to be scattered in a location or manner requested by the deceased. Once the remains are scattered in this fashion, the urn is unlikely to be reused and may be stored until discarded.

In view of the limitations of currently available products, there exists a need for a memorial product that allows cremation remains to be protected and displayed. Such a product may create additional opportunities to remember the deceased allowing friends and family members to remember the deceased without the morbid association of urns and other funeral products.

A memorial product is presently disclosed that includes a glass structure having a first helix of cremation remains and a second helix of a second material, wherein the helix of cremation remains and the helix of the second material are intertwined to form a double helix in the glass structure. In some embodiments, the memorial product may be generally egg-shaped. The second material may be a colored material, and the colored material may be selected to correspond to the deceased represented by the cremation remains. In another embodiment, the second material may be cremation remains, such as remains from a second individual. The memorial product may also have a planar bottom portion, and may include etching corresponding to the cremation remains. The memorial product may also include an artifact associated with the deceased represented by the cremation remains. In embodiments, the memorial product may be at least three inches tall. In other embodiments, the memorial product may be at least six inches tall. The memorial product may contain two or more gathers of glass. The glass structure of the memorial product may also include a color additive that is a different color than either of the second material or the cremation remains. In another embodiment, the memorial product includes a stand configured to support the glass structure for display. The stand may include a light source positioned beneath the glass structure to illuminate the glass structure. In yet another embodiment, the memorial product may include a plurality of voids disposed within the glass structure, where the voids have a coefficient of refraction different than the cremation remains, the second material, and the glass structure. The memorial product may include a graphical code, such as a one or two dimensional bar code. In another embodiment, the code is a quick response ("QR") code. The graphical code may be disposed on the glass structure. The graphical code may also provide access to information about a deceased represented by the cremation remains.

Also disclosed is a method of manufacturing a memorial product. The method may include forming a first portion of molten glass into a substantially cylindrical shape having an exterior surface, applying cremation remains on a first portion of the exterior surface, applying a second material on a second portion of the exterior surface, and gathering a second portion of molten glass over the first portion of molten glass to encase the cremation remains and the second material. The method may also include twisting the first portion of molten glass after applying the cremation remains and second material such that the cremation remains and the second material form intertwined helices.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION OF THE DRAWINGS

Presently disclosed is a memorial product containing cremation remains and a method of manufacturing a memorial product containing cremation remains. Referring generally to FIGS. 1 through 9, various embodiments of a memorial product are illustrated. A memorial product may have a glass structure with cremation remains disposed within the glass. The memorial product may also have a second material disposed within the glass structure. The cremation remains and the second material may each form a helix, and the respective helices may be intertwined to form a double helix configuration.

Figure 1:
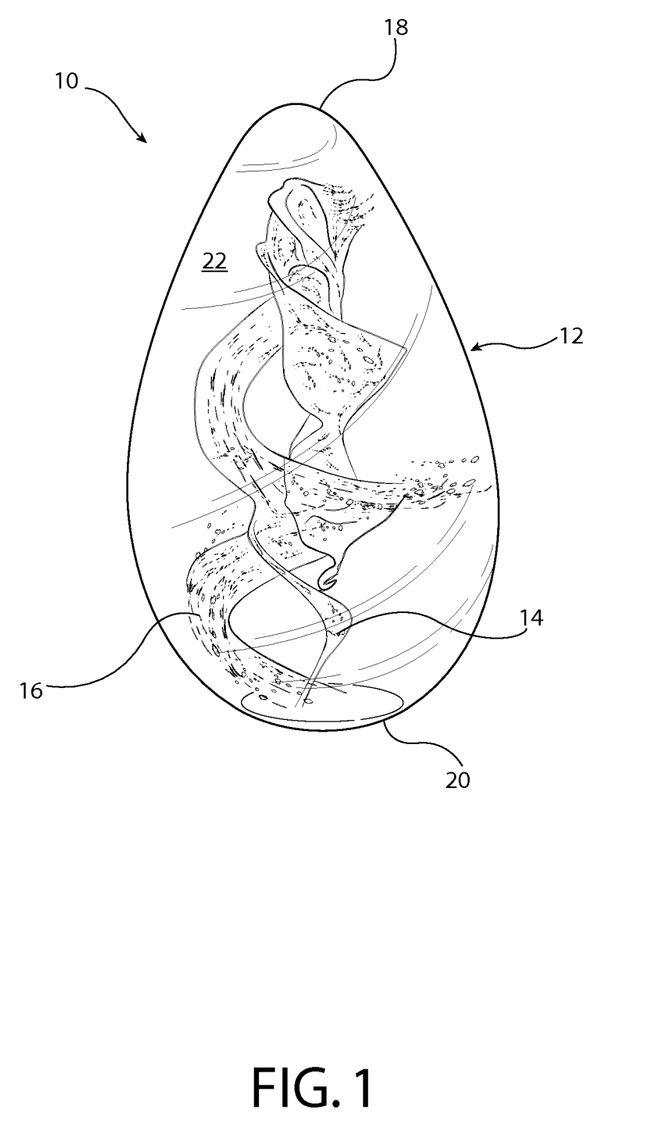
FIG. 1 is a perspective view of a memorial product.

Referring now to FIG. 1, an embodiment of a memorial product 10 is illustrated. The memorial product 10 includes a glass structure 12. The memorial product 10 also includes cremation remains 14, and the cremation remains are configured as a first helix in the glass structure. A second material 16 is also provided as a second helix in the glass structure, such that the first and second helices are intertwined to form a double helix. As used herein, a helix refers to a generally spiral configuration and may include helicoids. The size, shape, and configuration of the cremation remains 14 and the second material 16 may be varied in a variety of patterns or configurations generally representing a helix, and all such configurations are intended to be encompassed by the term helix as used here.

In the memorial product 10, the cremation remains 14 may include ash and bone material giving the cremation remains a generally grayish or whitish color. The second material 16 may be opaque, such as a colored art glass. The color of the second material 16 may be selected as desired and may be chosen to accentuate the cremation remains. In one embodiment, the colored material may be selected to contrast with the grayish or whitish cremation remains improving the visibility of the cremation remains in the memorial product. In other embodiments, the colored material may be selected to correspond to the deceased person or pet represented by the cremation remains. By way of example, the color of the second material may be selected as a favorite color of the deceased, as the eye or hair color of the deceased, or as another color which the purchaser of the memorial product may have associated with the deceased. In other embodiments, the second material may have no relationship to the deceased and may be selected solely based on the preferences of the purchaser of the memorial product.

In other embodiments, the second material 16 is cremation remains. The second material 16 comprising cremation remains may be remains from the same individual as the cremation remains 14. Alternatively, the second material 16 may comprise cremation remains of a second individual. For example, the memorial product 10 may include the cremation remains of two parents or grandparents creating a memorial for the family. The cremation remains may represent individuals who are related in some manner, however no relationship is required. In another alternative, the cremation remains of a beloved pet may be encased in the memorial product along with the cremation remains of another beloved pet or even the pet's owner. In each case, the memorial product 10 provides a lasting memorial to the one or more individuals or pets who's cremation remains are encased in the glass structure.

In yet other embodiments, the memorial product 10 may include a third material. The third material may be additional cremation remains from the same or another individual. The third material may be another colored material. In embodiments where the second material 16 is cremation remains, the third material may be selected to accent the cremation remains of the two deceased individuals represented in the memorial product. In other embodiments, both the second material and the third material may be a colored material, of the same or different colors selected to provided a desired appearance for the memorial product. As the size of the memorial product 10 is increased, a fourth material, or more, may be included. In still other embodiments, the glass structure may include a color additive, where the color additive is a different color than the second material and the cremation remains. The color additive may impart a color or hue to the glass structure without obscuring the cremation remains or the second material. For example, the color additive may give the entire glass structure a ting while still permitting the cremation remains the second material to be viewed through the glass structure.

As illustrated in FIG. 1, the memorial product 10 is generally egg-shaped having a top portion 18, a bottom portion 20, and an outer surface 22. A generally egg-shaped glass object will be understood to be of a generally oval shape enlarged on one end. As a memorial product, the egg-shaped glass structure may create an association with life and remembrance of the deceased whose cremation remains are embedded in the glass structure. Additionally, the configuration of the cremation remains and the second material being arranged in an intertwined or double helix may generally resemble the double helix configuration of DNA, which is widely known and often associated with the creation or representation of life. In this manner, the memorial product in various configurations may connect the cremation remains of the deceased with images of life improving the remembrance process.

In other alternatives, the memorial product may be configured in a generally cylindrical configuration. Other shapes and sizes are also contemplated and the memorial product may be manufactured in any suitable shape as desired. In some embodiments, the memorial product 10 may have a height as measured from the bottom portion to the top portion. The memorial product may be formed in a range of sizes. In embodiments, memorial products have been formed approximately three, six, eight and ten inches in height depending upon the size desired. As discussed in more detail below, the memorial product contains at least two gathers of glass, and may contain at least three or more gathers of glass for larger sizes. In many embodiments, such as the egg-shaped embodiment illustrated, the top portion 18 of the memorial product 10 may be rounded or curved. The outer surface 22 may also be smoothed and polished to improve the clarity of the finished product and remove any rough or sharp edges that may be formed during the manufacturing process.

Figure 2:
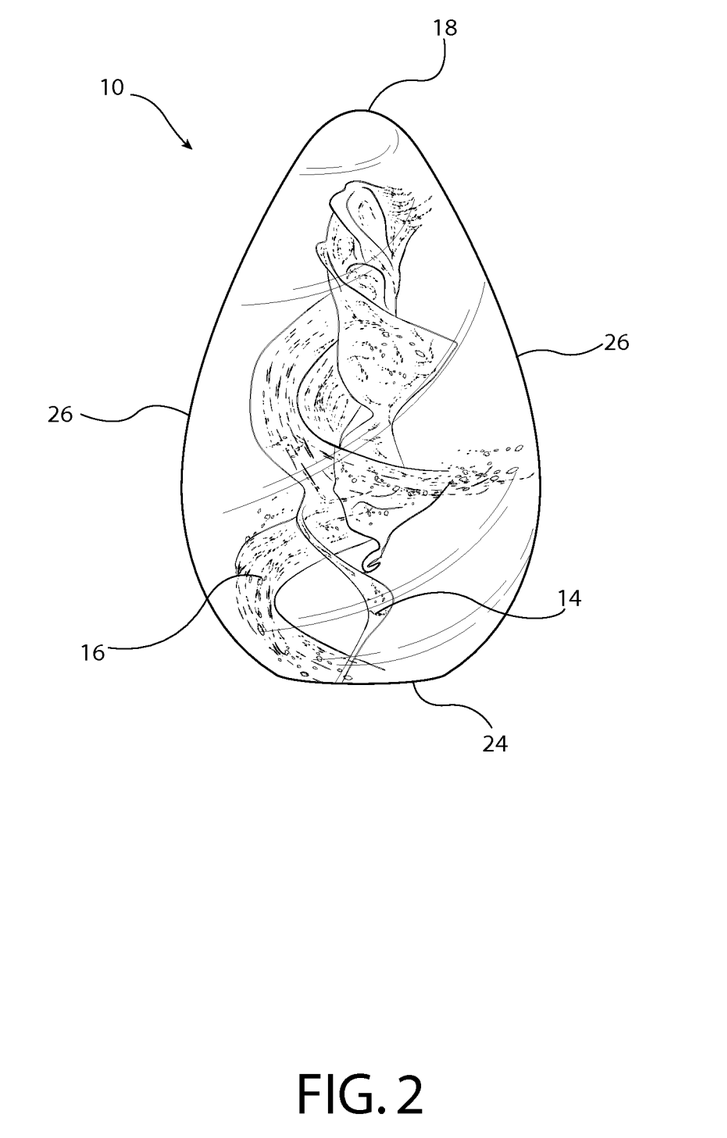
FIG. 2 is a side view of a memorial product.

In some embodiments, the memorial product 10 may include a planar bottom portion 24 as shown in the side view of FIG. 2. The planar bottom portion 24 may be formed by grinding or cutting the bottom portion of the memorial product 10, and polishing to form a smooth surface. The planar bottom portion 24 allows the memorial product to be placed for display, such as on a shelf or table without rolling. As shown in FIG. 2, the cremation remains 14 and the second material 16 extend generally from near the bottom portion to near the top portion 18 of the memorial product. In other embodiments, the cremation remains and second material may extend only partially through the glass structure, such as through at least 50% or at least 75% of the height of the glass structured from the bottom portion to the top portion. The outer surface of the glass structure may form side portions 26 which may define the egg-shape of the glass structure previously discussed.

Figure 3:
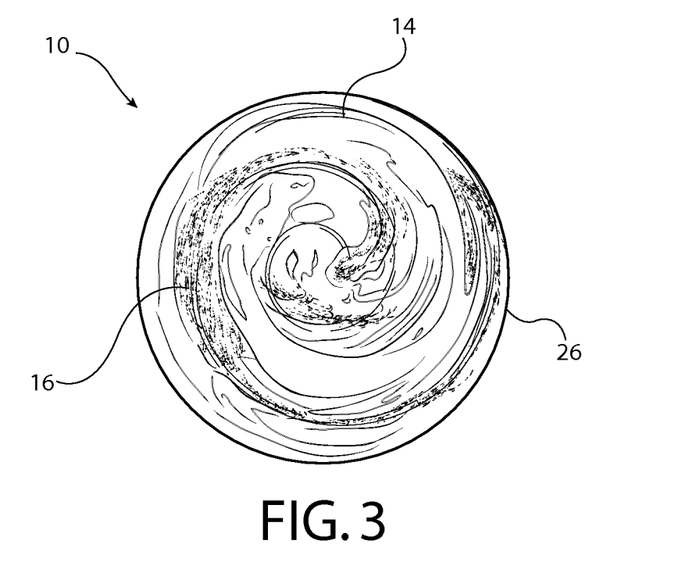
FIG. 3 is a top view of a memorial product.
Figure 4:
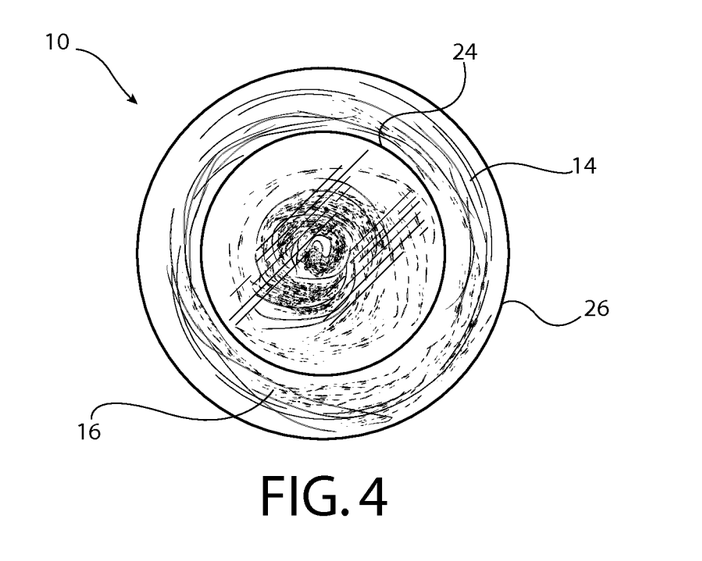
FIG. 4 is a bottom view of a memorial product.

Referring now to FIGS. 3 and 4, top and bottom views of the memorial product 10 are shown illustrating the cremation remains 14 and the second material 16 disposed within the glass structure. Viewed from above or below, the cremation remains and the second material may at least partially overlap as the helix of each respective material are intertwined. In addition, the curvature of the top portion 18 may create an optical effect causing the helices to appear substantially as concentric circles within the glass structure. A different optical effect may be achieved when viewing the memorial product 10 through the planar bottom portion 24.

In some embodiments, the bottom portion of the memorial product may have an etching corresponding to the cremation remains. For example, the name or names of the deceased represented by the cremation remains may be etched into the bottom portion of the memorial product. Other information, such as dates of birth and death, family relationship, or other information may also be included. The planar bottom portion 24 of the memorial product 10 may be sized to accommodate the etching desired. In one embodiment, the etching of the bottom portion is achieved by laser engraving, however, other methods of etching, engraving, or otherwise marking the bottom portion of the glass structure may be used.

Figure 10:
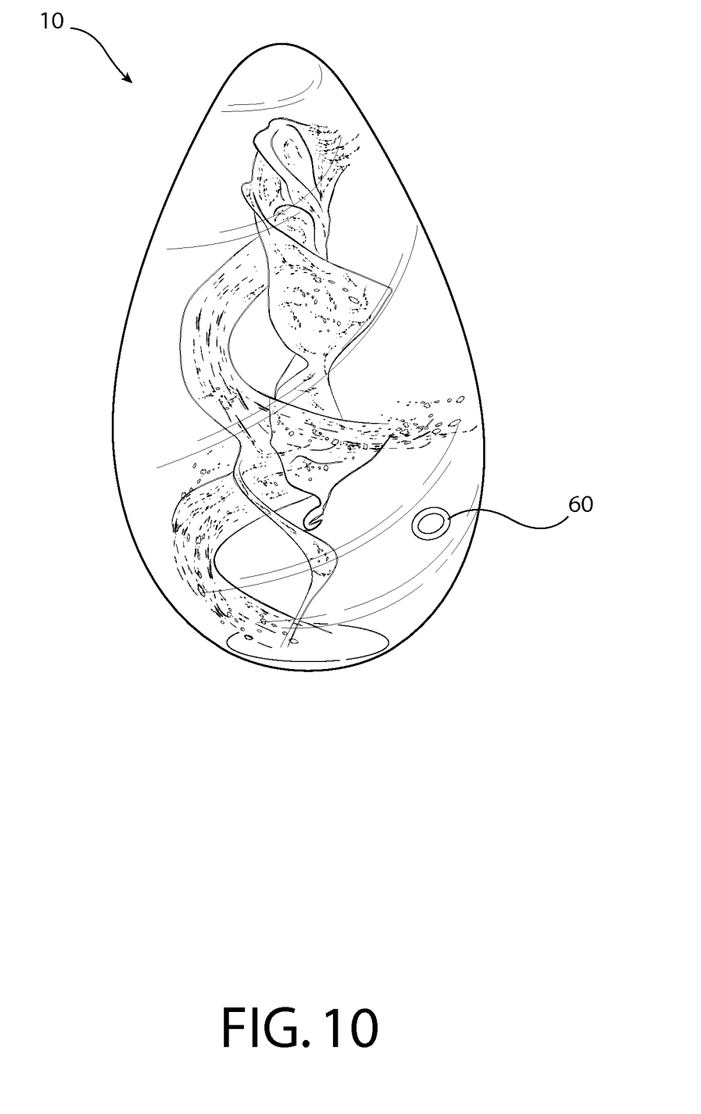
FIG. 10 is a perspective view of a memorial product including an artifact.

In yet another embodiment, the memorial product 10 may include an artifact 60 (see FIG. 10) associated with the deceased represented by the cremation remains. The artifact may be embedded in the glass structure either before or after the cremation remains and second material. The artifact may include any object that is desired to be encased with the cremation remains, provided that the artifact is formed of a material capable of withstanding the manufacturing processes of the memorial product. For example, the artifact may be certain gems, stones and metals capable of withstanding the temperatures necessary for manufacture of the glass structure of the memorial product.

Figure 5:
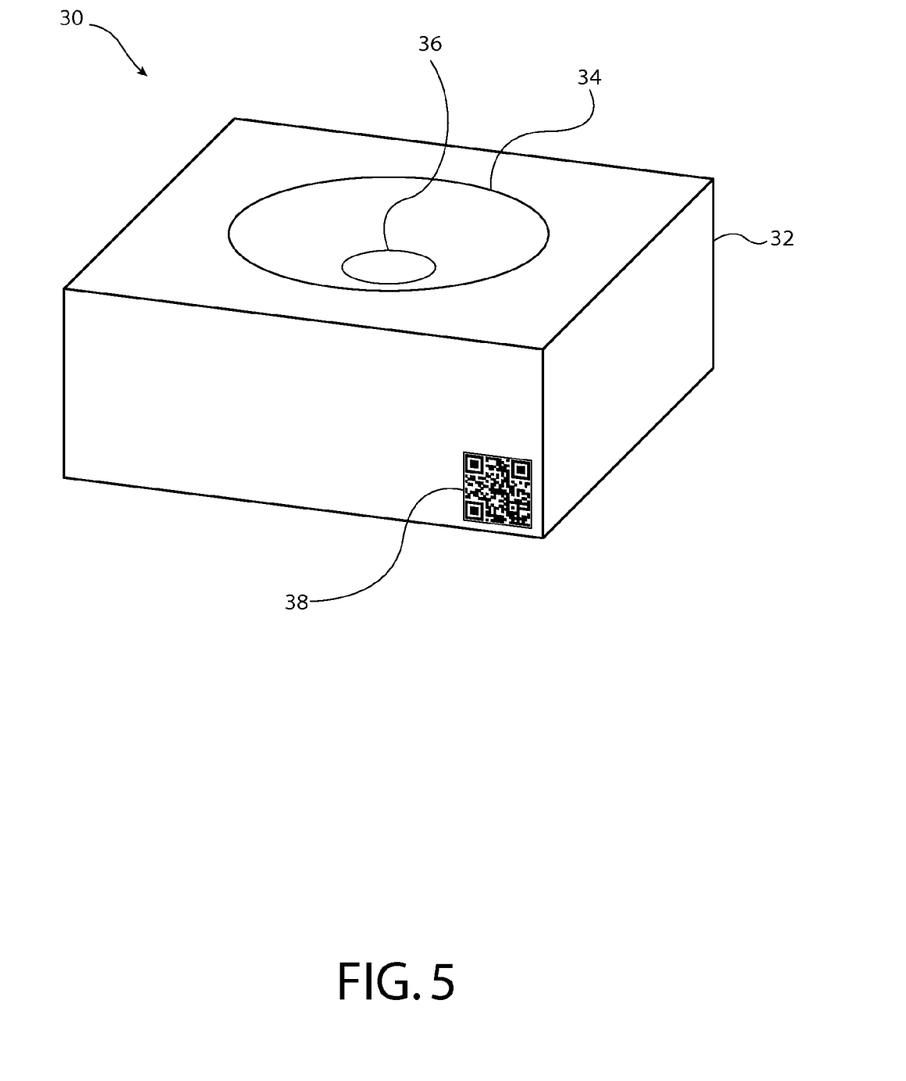
FIG. 5 is a perspective view of a stand for a memorial product.

Referring now to FIG. 5, a memorial product may also include a stand 30 configured to support the glass structure for display. In one embodiment, the stand 30 comprises a box 32. The box 32 may be formed of wood, metal, plastic or other desired material of sufficient strength to support the glass structure. The stand also has a recess 34 configured to receive the bottom portion of the glass structure. The recess 34 may have sufficient depth to provide lateral support to the glass structure when placed in the recess of the stand. The recess may also include padding, such as felt pads, to cushion the glass structure and reduce the likelihood of the glass structure being damaged or scratched when placed on the stand.

In some embodiments, the stand 30 includes a light source 36 positioned beneath the glass structure to illuminate the glass structure. The light source may be an LED light source, an incandescent light source, or other light source as desired. The light may be white or colored. When illuminated, the light source directs light into the glass structure to illuminate the cremation remains contained in the glass structure. The memorial product may also include a plurality of voids disposed within the glass structure. The voids may appear as bubbles embedded in the glass structure and may have a coefficient of refraction different than the glass of the glass structure. The voids may have a coefficient of refraction that is also different than the cremation remains or colored material. When used in combination with a light source 36 of the stand 30, the voids may refract light passing through the glass structure to further illuminate the cremation remains and second material, such as a colored material.

In yet another embodiment, a memorial product may include a graphical code, such as a bar code or quick response or ("QR") code. The code may be placed on the glass structure, on the stand, or on informational materials provided with the memorial product. The code may be a one dimensional bar code, a two dimensional barcode, a quick response ("QR") code, or other code used to provide access to information related to the cremains. As shown in FIG. 5, a QR code 38 may be disposed on the stand of the memorial product. The QR code is a matrix or two dimensional barcode that is used to store information. The QR code may be read and decoded using commercially available software. In one embodiment, the QR code of the memorial product may be used to store a website address, such as uniform resource locator. A QR code directing the user to a website address may allow the user to find information about a deceased represented by the cremation remains in the glass structure. The information made available through the website may include biographic information about the deceased. Other information, such as photographs, videos, or music associated with the deceased may also be accessed. It has become common to present a video presentation during calling hours or at the funeral services for deceased individuals. The QR code may provide access to a website hosting this multimedia presentation associated with the deceased for later viewing. The QR code thus creates a connection between the memorial product and additional information about the deceased that would not otherwise be readily available In one embodiment, a memorial product may include a substantially egg-shaped glass structure with a first helix of cremation remains and a second helix of a colored material intertwined to form a double helix, where each helix includes at least one turn. The memorial product may also include a plurality of voids disposed within the glass structure, the voids having a coefficient of refraction different than the cremation remains, the colored material and the glass structure. The glass structure may also have a planer bottom portion as previously discussed. In some embodiments, the memorial product may include a QR code disposed on the glass structure that provides access to information about a deceased represented by the cremation remains.

Also disclosed is a method of manufacturing a memorial product containing cremation remains. The method may include forming a first portion of molten glass into a substantially cylindrical shape having an exterior surface, applying cremation remains on a first portion of the exterior surface and applying a second material on a second portion of the exterior surface, and gathering a second portion of molten glass over the first portion of the molten glass to encase the cremation remains and the second material.

Figure 6:
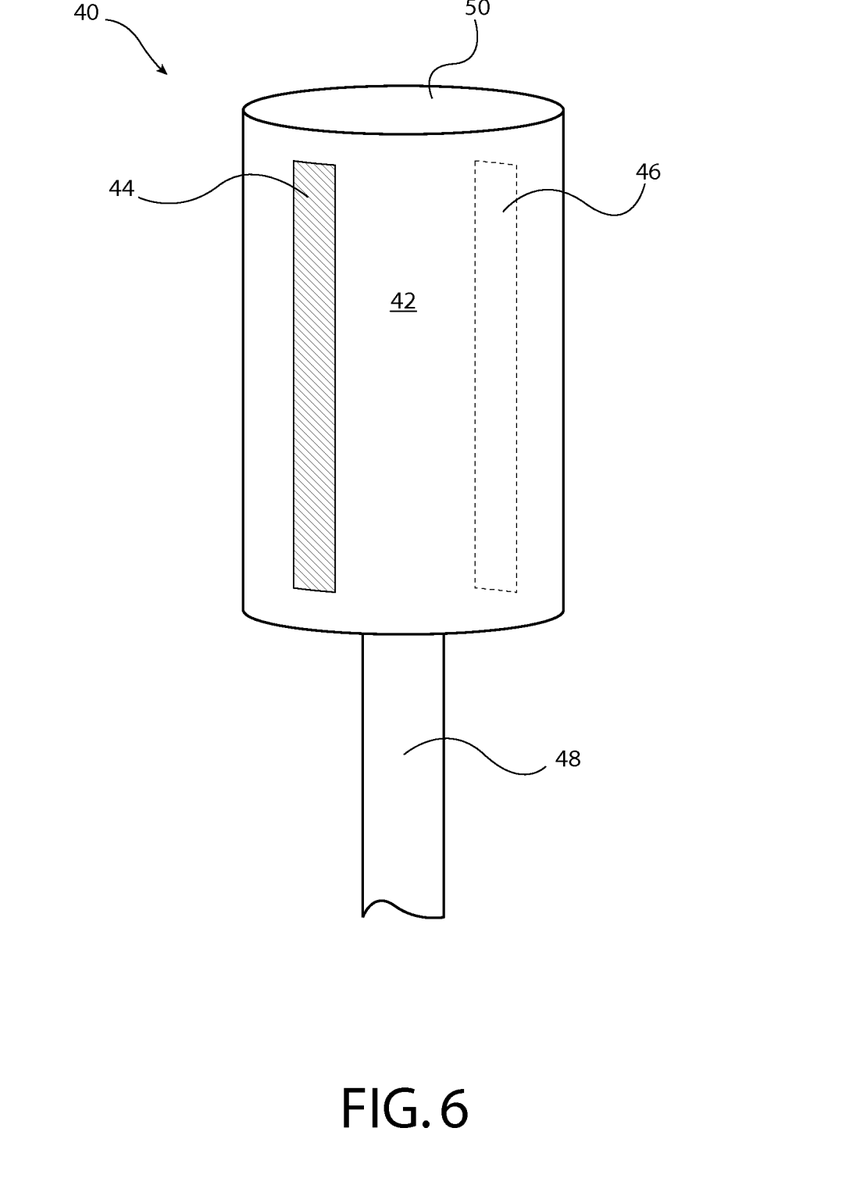
FIG. 6 is a perspective view of a first portion of molten glass.

Referring now to FIG. 6, a first portion 40 of molten glass is illustrated attached to glass-working tool 48. As used herein, the term molten glass includes glass that is not fully solidified. In glass working, glass particles may be melted to a molten state or may be allowed to partially solidify to facilitate working and shaping of the glass. A glass-working tool 48 may be used to gather the first portion 40 of molten glass, which is then worked into a substantially cylindrical shape having exterior surface 42. As will be apparent, the substantially cylindrical shape includes a generally circular or oval radial cross section, but need not be an exact cylinder. As the molten glass will be malleable the shape of the first portion of molten glass may be adjusted or modified as needed to achieve the desired configuration. Once the first portion 40 of molten glass has been formed to the desired shape, cremation remains 44 may be applied to a first portion of the exterior surface 42 of the molten glass. A second material 46 may also be applied to a second portion of the exterior surface 42 of the molten glass. As illustrated in FIG. 6, the cremation remains 44 and the second material 46 may be applied in a line extending substantially along the length of the first portion 40 of molten glass. In one embodiment, the cremation remains 44 are arranged in a line on a glass-working table and the first portion 40 of molten glass is touched or pressed onto the cremation remains. The second material 46 may be applied to the exterior surface 42 of the molten glass in a similar manner. As shown, the second material 46 may be applied to the exterior surface of the molten glass approximately 180 degrees apart from the cremation remains 44. In other configurations, the second material 46 may be applied to the exterior surface less than 180 degrees from the cremation remains resulting in a different configuration of the materials within resulting glass structure. In yet other embodiments, a third material may be applied to the exterior surface of the molten glass, and each of the cremation remains, second and third materials, may be separated by approximately 120 degrees.

After the cremation remains 44 and the second material 46 are applied to the exterior surface 42 of the molten glass, a second portion of molten glass may be gathered over the first portion of molten glass to encase the cremation remains and the second material. Gathering the second portion of molten glass may include placing the first portion of molten glass into a furnace and collecting additional molten glass over the first portion attached to the glass-working tool 48. The second portion of molten glass collected may be shaped to form the outer surface of the memorial product, resulting in a memorial product that comprises two gathers of glass. In other embodiments, a third portion of molten glass may be gathered over the second portion to produce a larger memorial product.

The method of manufacturing a memorial product may also include twisting the first portion 40 of molten glass after applying the cremation remains and second material such that the cremation remains and the second material form intertwined helices. The first portion of molten glass may be twisted by rotating the glass-working tool 48 while securing the free end 50 of the molten glass. Alternatively, the glass-working tool 48 may be held while the free end 50 of the molten glass is turned. A variety of glass-working tools, such as pliers or tongs, may be used to turn the free end of the molten glass. As the first portion of molten glass is malleable, twisting the molten glass causes the exterior surface to form a spiral configuration. The molten glass may be twisted to any degree desired consistent with the amount of glass being used. In some embodiments, the molten glass may be twisted one turn (360 degrees), one and one-half turns (540 degrees), two turns (720 degrees), or more. As a result of twisting, the cremation remains and the second material may be formed into a helix as the exterior surface of the molten glass is deformed. Once the first portion of molten glass has been twisted to form the intertwined helices, the second portion of molten glass may be gathered over the first portion to encase the cremation remains and second material as previously discussed. In other embodiments, the method of manufacturing a memorial product may also include forming a plurality of voids within the memorial product prior to solidification of the molten glass. The voids may be formed in the first portion of molten glass, the second portion of molten glass, or both as desired. In some embodiments, the second material may comprise colored glass that has been prepared as a powder or small particles to be applied to the exterior surface. The method of manufacturing may also include at least partially melting the colored glass of the second material. The memorial product created by the method previously described may be formed into an egg-shape, or other shapes as described above. Additionally the memorial product may be provided with a stand, such as the lighted stand.

Figure 7:
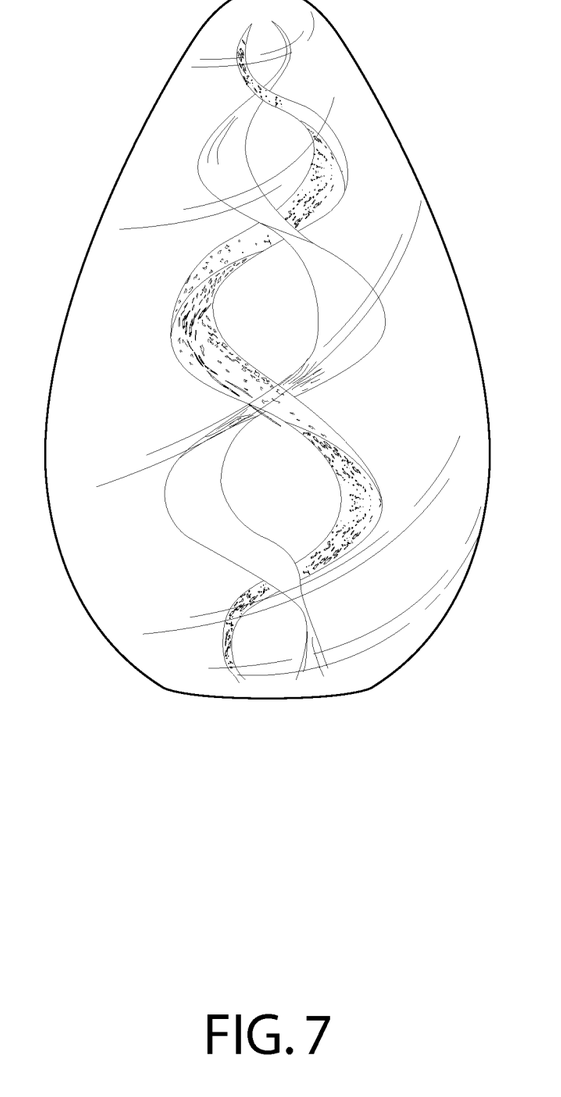
FIGS. 7-9 are side views of additional embodiments of memorial products.
Figure 8:
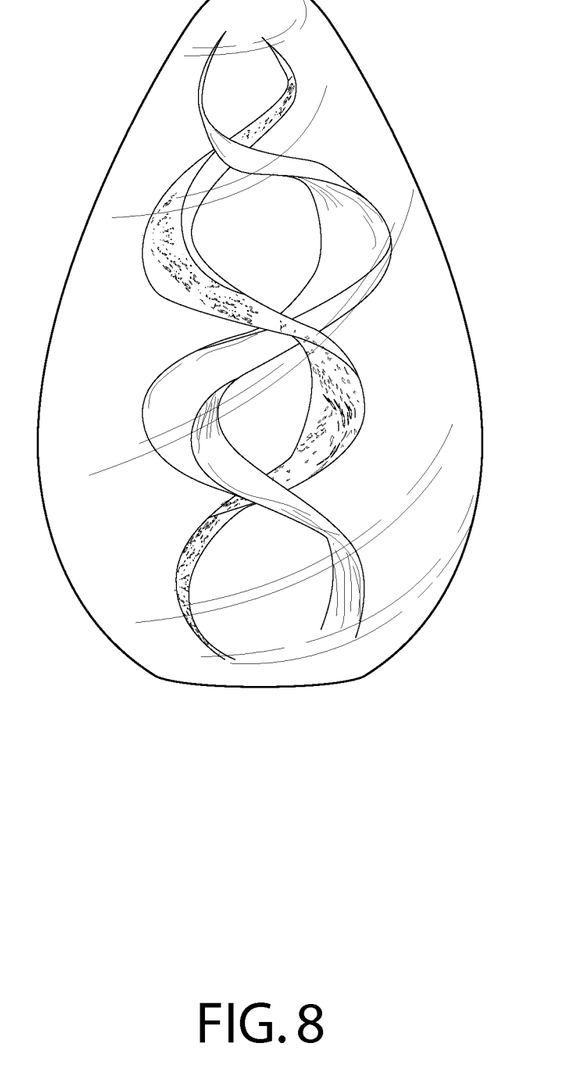
Figure 9:
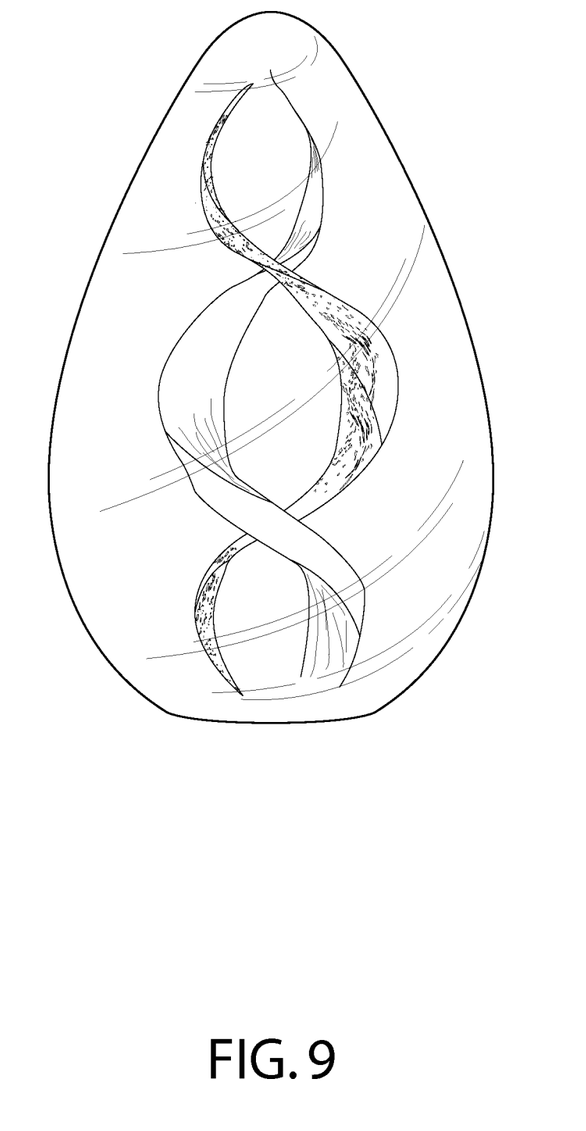

Referring now to FIGS. 7 through 9, a selection of memorial products manufactured in accordance with the present disclosure are further illustrated. The memorial products shown herein depict various features and configurations of the memorial product as previously mentioned.

A memorial product as presently disclosed may provide a means for displaying cremation remains with advantages over urns and other previously available products. The memorial product may be manufactured using a small portion of the cremation remains allowing multiple memorial products to be created from the cremation remains of an individual. Additionally, a memorial product may be created with a portion of the cremation remains leaving the remainder of the cremation remains available for scattering in accordance with the wishes of the deceased. The memorial product may also allow cremation remains from two or more individuals to be displayed in the same memorial product while retaining the separate identity of each of the cremation remains.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

While certain embodiments have been described, it must be understood that various changes may be made and equivalents may be substituted without departing from the spirit or scope of the present disclosure. In addition, many modifications may be made to adapt a particular situation or material to the teachings of the disclosure without departing from its spirit or scope.

What is claimed is:

1. A memorial product comprising: a glass structure having a first helix of cremation remains and a second helix of a second material, wherein the helix of the cremation remains and the helix of the second material are intertwined to form a double helix in the glass structure.

2. The memorial product as claimed in claim 1, where the glass structure is egg-shaped.

3. The memorial product as claimed in claim 1, where the second material is a colored material.

4. The memorial product as claimed in claim 3, where a color of a colored material is selected to correspond to the deceased represented by the cremation remains.

5. The memorial product as claimed in claim 1, where the second material is cremation remains.

6. The memorial product as claimed in claim 1, further comprising: a planar bottom portion.

7. The memorial product as claimed in claim 6, where the planar bottom portion contains an etching corresponding to the cremation remains.

8. The memorial product as claimed in claim 1, further comprising: an artifact associated with a deceased represented by the cremation remains.

9. The memorial product as claimed in claim 1, where the glass structure includes at least two gathers of glass.

10. The memorial product as claimed in claim 1, where the glass structure includes a color additive, the color additive being a different color than the second material and the cremation remains.

11. The memorial product as claimed in claim 1, further comprising: a stand configured to support the glass structure for display, the stand having a light source positioned beneath the glass structure to illuminate the glass structure.

12. The memorial product as claimed in claim 1, further comprising: a plurality of voids disposed within the glass structure.

13. The memorial product as claimed in claim 1, further comprising: a graphical code that provides access to information about a deceased represented by the cremation remains.

14. The memorial product as claimed in claim 13, where the graphical code is a bar code or quick response code.

15. A memorial product comprising:
   a substantially egg-shaped glass structure comprising
      a first helix of cremation remains and a second helix of a colored material, where the first helix of cremation remains and the second helix of colored material are intertwined to form a double helix, and where each helix includes at least one turn,
      a plurality of voids disposed within the glass structure, the voids having a co-efficient of refraction different than the cremation remains, the colored material and the glass structure, and
      a planar bottom portion, and
      a graphical code that provides access to information about a deceased represented by the cremation remains.

16. A method of manufacturing a memorial product comprising:
   forming a first portion of molten glass into a substantially cylindrical shape having an exterior surface,
   applying cremation remains on a first portion of the exterior surface,
   applying a second material on a second portion of the exterior surface, and
   gathering a second portion of molten glass over the first portion of molten glass to encase the cremation remains and the second material.

17. The method of manufacturing a memorial product as claimed in claim 16, further comprising:
   twisting the first portion of molten glass after applying the cremation remains and second material such that the cremation remains and the second material form intertwined helices.

18. The method of manufacturing a memorial product as claimed in claim 16, further comprising:
   forming a plurality of voids within the memorial product prior to solidification of the molten glass.

19. The method of manufacturing a memorial product as claimed in claim 16, where the memorial product is substantially egg-shaped.

20. The method of manufacturing a memorial product as claimed in claim 16, where the second material is colored glass and where the method further comprises at least partially melting the colored glass.

* * * * *